United States Patent [19]

Ohlinger et al.

[11] 4,061,725

[45] Dec. 6, 1977

[54] MANUFACTURE OF GAMMA-IRON(III) OXIDE

[75] Inventors: Manfred Ohlinger, Frankenthal; Eduard Schoenafinger, Ludwigshafen; Walter Schneider, Ludwigshafen; Heinz Stritzinger, Ludwigshafen; Guenter Vaeth, Limburgerhof, all of Germany

[73] Assignee: BASF Aktiengesellschaft, Ludwigshafen, Germany

[21] Appl. No.: 732,899

[22] Filed: Oct. 15, 1976

[30] Foreign Application Priority Data

Nov. 8, 1975 Germany .............................. 2550307

[51] Int. Cl.$^2$ ............................................. C01G 49/02
[52] U.S. Cl. ..................................... 423/634; 423/633
[58] Field of Search ............... 423/633, 634, 140, 142, 423/151, 152

[56] References Cited

U.S. PATENT DOCUMENTS

| | | |
|---|---|---|
| 3,845,198 | 10/1974 | Marcot ................................. 423/634 |
| 3,912,646 | 10/1975 | Leitner et al. ........................ 423/634 |
| 3,947,502 | 3/1976 | Leitner et al. ........................ 423/634 |

*Primary Examiner*—Earl C. Thomas
*Assistant Examiner*—Wayne A. Lange
*Attorney, Agent, or Firm*—Keil, Thompson & Shurtleff

[57] ABSTRACT

Acicular gamma-iron(III) oxide is manufactured by reacting an iron(II) salt solution with an aqueous solution of an alkali metal hydroxide and oxidizing the resulting suspension of iron(II) hydroxide in three stages. In a first stage, at most from 0.1 to 4% by weight of the amount of iron(II) hydroxide originally present is oxidized in the course of from 0.1 to 4 hours, in a second stage from 10 to 25% by weight of the said original amount are oxidized in the course of from 1.5 to 6 hours and in a third stage the remaining amount is oxidized. After the oxidation, the goethite formed is reduced to magnetite and the latter is then oxidized to acicular gamma-iron(III) oxide.

7 Claims, No Drawings

MANUFACTURE OF GAMMA-IRON(III) OXIDE

The present invention relates to a process for the manufacture of gamma-iron(III) oxide and to its use as a magnetizable pigment in magnetic recording media.

Acicular gamma-iron(III) oxide is employed extensively for the manufacture of magnetic recording media; this oxide is obtained, for example, from hydrated alpha-iron(III) oxide (alpha-FeOOH or geothite) with or without prior dehydration to alpha-iron(III) oxide(alpha-Fe$_2$O$_3$), reduction of the alpha-iron(III) oxide to magnetite (Fe$_3$O$_4$) and subsequent oxidation of the latter with oxygen-containing gases at from 100° to 400° C.

The magnetic and electro-acoustic properties of the gamma-iron(III) oxide depend decisively on the size and shape of the particles. This applies not only to the gamma-iron(III) oxide used as the magnetic pigment but also to the goethite used as the starting material, the geometrical shape and crystal size of which exert a decisive influence on the properties of the gamma-iron-(III) oxide manufactured therefrom.

Goethite suitable for conversion to magnetic gamma-iron(III) oxide can be obtained by either an acid or an alkaline process.

The acid process is carried out in two stages; in a first stage nuclei of goethite are manufactured in acid suspension, by oxidation, from iron(II) sulfate, and in a second stage further goethite is formed from the suspension, in the presence of metallic iron, by oxidation, this further material growing onto the nuclei formed in the first stage. This process has the disadvantage of a low space-time yield and of giving goethite which does not have a very pronounced acicular character. However, the process has the advantage that the reaction can be discontinued when a certain particle size is reached. In the case of the alkaline process, also carried out on an industrial scale, iron(II) hydroxide is first precipitated from an iron(II) salt solution by reaction with an excess amount of caustic alkali solution, and this hydroxide is then converted to goethite by passing oxygen-containing gases into the mixture. This process has the advantage, over the acid process, that the space-time yield is from about 5 to 10 times greater, that the goethite formed has a pronounced acicular character with a length to width ratio of from 15 to 20 : 1, and that the coercive force of the gamma-iron(III) oxide manufactured therefrom is very high. It is a disadvantage, however, that the size of the particles can only be controlled incompletely, since the reaction can only be discontinued when all the iron(II) hydroxide first precipitated has been oxidized, since otherwise the magnetic and electro-acoustic properties of the gamma-iron(III) oxide manufactured therefrom are adversely affected. However, a deliberate control of the particle size and hence of the surface area would be very desirable, since it would permit selection of the optimum properties of the magnetic pigment to be manufactured, in accordance with the intended use of the magnetic recording medium. In order to be able to reduce the disadvantages of the alkaline process and in particular to reduce the reaction time, it has been disclosed to stir the iron hydroxide suspension in an inert atmosphere before oxidizing the suspension. It has also been disclosed that fine goethite crystals can be obtained by dispersing the iron-(II) salt solution in the alkali metal hydroxide solution, in the absence of an oxidizing agent, in such a way that there is virtually no local excess of iron(II) salt. Furthermore, the final dispersion obtained should have a goethite concentration of less than 15 g/l and a dissolved alkali metal hydroxide concentration of less than 60 g/l. After oxidation, the resulting goethite dispersion should be heated to the boil to complete the crystallization. It is true that these conventional measures to some extent influence the pigment properties of the goethite and of the gamma-iron(III) oxide manufactured therefrom, but it is impossible to achieve a uniform and constant product quality with them.

It is an object of the present invention to provide a process for the manufacture of gamma-iron(III) oxide by reacting an aqueous solution of an iron(II) salt with an aqueous solution of an alkali metal hydroxide, oxidizing the suspension of iron(II) hydroxide, thus obtained, with oxygen or oxygen-containing gases to give goethite, reducing the resulting goethite, with or without prior dehydration to alpha-iron(III) oxide, to magnetite and oxidizing the magnetite to acicular gamma-iron(III) oxide, which process gives a product of uniform shape and size which can be used for the manufacture of magnetic recording media which have a high maximum output level and at the same time a high signal to print-through ratio.

We have found that this object is achieved if the oxidation of the iron(II) hydroxide suspension is carried out in three stages in such a way that in a first stage from 0.1 to 4% by weight of the amount of iron(II) present is oxidized in the course of from 0.1 to 4 hours, in a second stage from 10 to 25% by weight of the amount of iron-(II) originally present is oxidized in the course of from 1.5 to 6 hours and in a third stage the remaining amount of iron is oxidized.

It is essential that the oxidation of the iron(II) hydroxide should initially take place slowly and that the rate should gradually increase during the reaction, for example by increasing the feed of the oxidizing gas. Thus, not more than 4% by weight of the total amount of iron present in the suspension should be oxidized in the first stage, which takes from 0.1 to 4 hours. The oxidation can be started during the actual precipitation of the iron(II) hydroxide; however, to achieve a particularly uniform quality of product, it is advantageous only to start the oxidation as soon as possible after the precipitation, the latter being carried out under an inert gas atmosphere. This slow oxidation can be carried out by causing a turbulent motion, for example by stirring, of the suspension of the iron(II) hydroxide which, at the surface, is in contact with an oxygen-containing gas, e.g., the atmosphere. As a rule it is not necessary to pass an oxygen-containing stream of gas through the suspension.

In the second stage, the rate of oxidation is increased in such a way that from 10 to 25% by weight of the amount of iron(II) originally contained in the suspension is oxidized to trivalent iron over a period of from 2 to 6 hours. To increase the rate of oxidation, an oxygen-containing gas, e.g. air or oxygen, or oxygen diluted with an inert gas, e.g. nitrogen, is introduced into the suspension whilst continuing the turbulent motion, for example by stirring. Advantageously, the rate of oxidation is also increased during this stage, by increasing the feed of oxygen-containing gas through initially introducing from 0.04 to 0.1 mole of oxygen per hour per gram atom of the iron contained in the suspension and increasing this amount of oxygen continuously or stepwise to from 0.1 to 0.25 mole, up to the end of the second stage. Preferably, the second stage of the oxidation is carried out in the course of from 2 to 5 hours. Preferably, from 0.05 to 0.08 mole of oxygen per gram atom of the iron contained in the suspension is introduced per hour at the beginning of the second stage, and this amount of oxygen is increased, up to the end of the second stage, to from 0.12 to 0.20 mole of $O_2$ per gram atom of iron per hour. As a result of the slow and gradually increasing rate of oxidation up to the end of the second stage, a uniform formation of goethite nuclei commences and as a result, at the end of the entire oxidation stage, a goethite of uniform crystal size and shape and with geometrical dimensions of good reproducibility is obtained.

In the third stage, the oxidation is completed. Here the rate of oxidation is not so critical and it is therefore possible to increase the rate substantially in order to increase the space-time yield. For this reason, from 0.3 to 0.8 mole of oxygen, preferably from 0.5 to 0.7 mole of oxygen, per gram atom of the iron contained in the suspension can be introduced into the latter per hour, in the third stage.

The iron(II) hydroxide suspensions to be oxidized in accordance with the invention are conventionally obtained by precipitating iron(II) salt solutions, e.g. iron sulfate, iron chloride or iron nitrate with aqueous alkali metal hydroxide solutions, e.g. solutions of NaOH or KOH which are employed in from two-fold to five-fold excess over the stoichiometrically required amount. The suspensions obtained in this way usually contain from 2.5 to 10% by weight of iron(II) hydroxide. The oxidation is advantageously carried out at from 25° to 50° C. The reaction is carried out, for example, in a stirred kettle into the lower part of which the oxygen-containing gases are introduced, and distributed over the entire cross-section, in order to achieve very uniform distribution.

The goethite crystals obtained in accordance with the process of the invention are next dehydrated, if appropriate, by conventional methods at from 150° to 190° C to give alpha-iron(III) oxide, before being reduced with reducing gases, e.g. hydrogen, at from 350° to 500° C, to give magnetite, which is then oxidized in the presence of oxygen or oxygen-containing gases, e.g. air, at from 150° to 250° C, to give acicular gamma-iron(III) oxide.

Of course, gamma-iron(III) oxides modified with foreign elements, e.g. with cobalt or manganese, can also be manufactured by the process according to the invention. These elements can be introduced at any desired stage, e.g. by admixing salts of the foreign elements to the iron salt solutions when manufacturing the iron(II) hydroxide or subsequently applying the foreign elements to the surface of the goethite.

The gamma-iron(III) oxide pigments manufactured according to the invention have a very uniform particle size. This uniformity results from the fact that the goethite, which has a surface area (measured by the BET method) of from 15 to 30 $m^2/g$, also has a very narrow particle spectrum. Using the pigments obtained, magnetic recording media for the audio range, which possess a high maximum output level and at the same time a high signal to print-through ratio can be manufactured.

To manufacture magnetic coatings, the gamma-iron(III) oxide obtained from the alpha-iron(III) oxide manufactured according to the invention is dispersed by conventional methods in polymeric binders. Suitable binders for this purpose are conventional compounds, e.g. homopolymers and copolymers of vinyl derivatives, polyurethanes, polyesters and the like. The binders are used in solutions in suitable organic solvents, which may contain further additives, e.g. to increase the conductivity and abrasion resistance of the magnetic coatings. On milling the magnetic pigment, the binder and any additives, a homogeneous dispersion is obtained, which is applied to rigid or flexible bases such as films, sheets or cards. The magnetic particles contained therein are oriented by a magnetic field and the coating is then solidified by drying.

In the Examples, parts and percentages are by weight, unless stated otherwise.

EXAMPLE 1

19.4 kg of 15% strength sodium hydroxide solution are first introduced into a 30 l stirred kettle. 4.2 kg of 30.5% strength $FeCl_2$ solution are then added, whilst stirring. The resulting $Fe(OH)_2$ suspension is stirred for 1.5 hours in air at 35° C, during which time the concentration of $Fe^{++}$ falls by 0.5% from an initial value of 0.548 mole of $Fe^{++}$/l (10 ml of suspension consume 48.2 ml of N/10 $KMnO_4$ solution) to a $KMnO_4$ consumption of 47.9 ml. 53.5 l of air (0.05 mole of oxygen/gram atom of Fe) are then passed in for 1 hour.

During the next hour, the amount of air is increased to 107 l of air/hour (0.1 mole of oxygen/gram atom of Fe). The air is passed in at this rate for 2 hours. Thereafter, 160 l of air (0.15 mole of oxygen/gram atom of Fe) are passed in over a further 2 hours. During the period from the second hour to the fifth hour inclusive, 24% by weight of the $Fe^{++}$ originally contained in the solution have been oxidized. From the 6th hour onward, 700 l of air (0.6 mole of oxygen/gram atom of Fe) are passed in per hour. During this stage the temperature remains at 35° C. The oxidation has ended after a further 13 hours. The acicular goethite is filtered off, washed and dried. The yield is 900 g of goethite, having a surface area of 21 $m^2/g$, measured by the BET method. The tap density is 0.28 $g/cm^3$.

EXAMPLE 2

19.2 kg of 12% strength sodium hydroxide solution are first introduced into a 40 l kettle. 8.2 kg of 19% strength $FeSO_4$ solution are added, whilst stirring. The $Fe(OH)_2$ suspension formed is stirred at 38° C in air until, after 2 hours, the concentration of iron(II) has fallen from 0.43 mole/l to 0.42 mole/l, corresponding to a decrease in the $Fe^{++}$ content of 2.3%. 51 l of air (0.048 mole of oxygen/gram atom of Fe) are now passed in in the course of 1 hour, whilst stirring constantly. The amount of air is raised by 51 l each hour until, after a total of 5 hours' introduction of air, it has reached 225 l/hour (0.24 mole of oxygen/gram atom of Fe). Air is passed in at this rate for 1 hour. In the period from the second hour to the fifth hour inclusive, 22.5% by weight of the $Fe^{++}$ originally contained in the solution have been oxidized. From the sixth hour onward, the amount of air is increased to 850 l/hour (0.8 mole of oxygen/gram atom of Fe). The oxidation has ended after a further 11 hours. During the entire course of the oxidation, the contents of the kettle are kept at 38° C and stirred. The acicular goethite is filtered off, washed and dried. The yield is 900 g of goethite having a surface area of 23 $m^2/g$ measured by the BET method. The tap density is 0.30 $g/cm^3$.

COMPARATIVE EXAMPLE A 19.4 kg of 15% strength sodium hydroxide solution are first introduced into a 30 l stirred kettle, as in Example 1. 4.2 kg of 30.5% strength $FeCl_2$ solution are added, whilst stirring. When the precipitation of $Fe(OH)_2$ has ended, 280 l of air/hour (0.25 mole of $O_2$/gram atom of Fe) are passed into the suspension and the temperature is kept at 38° C. After 39 hours, the entire iron(II) hydroxide has been oxidized. The surface area, measured by the BET method, of the acicular pigment is 25 $m^2/g$ and the tap density is 0.31 $g/cm^3$.

COMPARATIVE EXAMPLE B 19.4 kg of 15% strength sodium hydroxide solution are first introduced into a 30 l stirred kettle, as in Example 1. 4.2 kg of 30% strength $FeCl_2$ solution are added, whilst stirring. When the precipitation of $Fe(OH)_2$ has ended, 1,500 l of air/hour (1.4 mole of $O_2$/gram atom of Fe) are passed into the suspension and the temperature is kept at 38° C. The surface area, measured by the BET method, of the acicular pigment is 48 $m^2/g$ and the tap density is 0.42 $g/cm^3$.

EXAMPLE 3

19.4 kg of 15% strength sodium hydroxide solution are first introduced into a 30 l stirred kettle. 8.2 kg of 19% strength $FeSO_4$ solution, in which 34 g of cobalt chloride ($CoCl_2 . 6 H_2O$) and 6.7 g of manganese sulfate ($MnSO_4 . 4 H_2O$) are dissolved, are added whilst stirring. The resulting suspension is processed further as described in Example 1. The resulting acicular goethite, modified with 1.5% of Co and 0.3% of Mn, has a surface area, measured by the BET method, of 24 $m^2/g$ and a tap density of 0.31 $g/cm^3$.

EXAMPLE 4

400 g of goethite from Example 1 are suspended in 10 l of $H_2O$, with vigorous stirring. 11.1 g of $CoCl_2$ and 1.6 of $MnSO_4$, dissolved in 1.0 l of water, are then added. The pH is brought to 7 by means of dilute sulfuric acid, whilst stirring. It is then raised to 9 by means of ammonia. The product is then filtered off and dried at 200° C.

COMPARATIVE EXAMPLE C

Following the method described in Example 4, goethite from Comparative Example A is encapsulated in cobalt hydroxide and manganese hydroxide, filtered off and dried at 160° C.

The table which follows gives some characteristic measurements on the goethite obtained as described in Examples 1 to 4 and A to C:

| Example | 1 | 2 | A | B | 3 | 4 | C |
|---|---|---|---|---|---|---|---|
| Tap density, $g/cm^3$ | 0.28 | 0.30 | 0.31 | 0.42 | 0.31 | 0.28 | 0.31 |
| BET surface area, $m^2/g$ | 21 | 23 | 25 | 48 | 24 | as 1 | as A |
| Average needle length $(/\mu)$ | 1.0 | 0.9 | 0.8 | 0.4 | 0.9 | " | " |
| Needle length from/to $(/\mu)$ | 0.9/1.1 | 0.8/1.0 | 0.6/1.1 | 0.2/0.7 | 0.8/1.0 | " | " |
| Length to width ratio | 17:1 | 17:1 | 12:1 to 18:1 | 10:1 to 20:1 | 17:1 | " | " |

As can be seen from this table, the goethite obtained by the process according to the invention, in accordance with Examples 1 to 4, is distinguished by a narrower particle size spectrum, shown by the values of the needle length and of the length to width ratio.

EXAMPLE 5

Conversion of the geothite, obtained as described in the previous Examples, to magnetic gamma-iron(III) oxide The alpha-iron(III) oxide pigments obtained as described in Examples 1 to 4 and Comparative Examples A, B and C are reduced by the same conventional method in a fluidized bed furnace at 400° C, in a hydrogen atmosphere, to give $Fe_3O_4$, and the latter is then re-oxidized in a stream of air, at from 200° to 250° C, to give gamma-iron(III) oxide. After compression to 0.85 $g/cm^3$, the pigments have the magnetic properties and specific surface areas shown in the table below.

| Powder values Example | 1 | 2 | A | B | 3 | 4 | C |
|---|---|---|---|---|---|---|---|
| $H_c$ (Oe) | 345 | 338 | 270 | 280 | 390 | 385 | 370 |
| Specific remanence ($nTm^3/g$) | 42.1 | 41.9 | 42.8 | 43.4 | 44.1 | 44.5 | 43.5 |
| BET surface area ($m^2/g$) | 10.8 | 11.7 | 12.5 | 15.5 | 10.8 | 10.8 | 12.5 |

Magnetic recording media, using a polyethylene terephthalate film as the base, are manufactured by the same conventional method from the gamma-$Fe_2O_3$ pigments obtained from the goethite manufactured according to the process of the invention, and from the pigments obtained according to Comparative Examples A to C. To produce the magnetic coating, the pigments are dispersed, in each case under identical conditions, in a partially hydrolyzed vinyl chloride/vinyl acetate copolymer to which a mixture of equal parts by volume of tetrahydrofuran and toluene has been added, and the dispersion is applied to the base film and dried. The thickness of the magnetic coating is in each case 16 $\mu$.

The magnetic and electro-acoustic properties are determined on the magnetic tapes, all of which have been manufactured identically, and are listed in the table which follows (the last-mentioned property have been measured in accordance with DIN 45,573, sheet 2, relative to reference tape Agfa PER 525, Charge 1544).

| Tape values Pigments from Examples | 1 | 2 | A | B | 3 | 4 | C |
|---|---|---|---|---|---|---|---|
| Relative bias current (dB) | 0 | 0 | 0 | 0 | +0.8 | +0.8 | +0.8 |
| $H_c$ (Oe) | 338 | 335 | 280 | 295 | 388 | 384 | 377 |
| Remanence (mT) in the preferred direction | 11.8 | 12.0 | 10.3 | 10.8 | 11.3 | 11.5 | 10.8 |
| Orientation ratio | 2.05 | 1.98 | 1.40 | 1.70 | 1.82 | 1.78 | 1.38 |
| Sensitivity (dB) | 0 | 0 | −0.5 | +0.2 | +0.6 | +0.4 | −0.9 |
| Frequency response (dB) | +2 | +1.8 | +0.7 | +0.5 | +2.2 | +2.5 | +0.8 |
| Distortion ratio (dB) | +5 | +3.8 | +1.0 | +1.5 | +3.5 | +2.8 | +1.3 |
| Relative reference level to bias noise ratio (dB) | +3 | +3.2 | −0.5 | +1.6 | +3.5 | +3.4 | +2 |
| Relative maximum output level to bias noise ratio (dB) | +3 | +3.2 | −1.0 | +1.8 | +4.1 | +3.8 | +1.1 |
| Signal to print-through ratio (dB) | 0 | −0.5 | −1.2 | −2.5 | −0.8 | −1.1 | −1.8 |

The improvement of from 1.5 to 4.0 dB in the distortion ratio (Examples 1 to 4) compared to Examples A to C, and the increase in the relative maximum output level to bias noise ratio, which is from 1.2 to 48 dB, show the substantially improved maximum output level of the magnetic recording media which contain the magnetic pigments manufactured according to the invention.

Though the magnetic recording media which contain the magnetic pigments manufactured according to the invention are improved in respect of the distortion ratio and the relative maximum output level to bias noise ratio, compared to the magnetic recording media according to the Comparative Examples, they also show an improvement of from 0.5 to 2.5 dB in the signal to print-through ratio. This is the more surprising since it is known that the signal to print-through ratio varies in the inverse sense to the change in the distortion ratio and the relative maximum output level to bias noise ratio, that is to say that it decreases as the distortion ratio or the relative maximum output level to bias noise ratio increases.

We claim:

1. In a process for the manufacture of acicular $\gamma$-iron(III) oxide wherein an aqueous solution of an iron(II) salt is reacted with an aqueous solution of an alkali metal hydroxide, the resulting suspensions of iron(II) hydroxide are oxidized with oxygen or oxygen-containing gases to goethite, the resulting goethite is reduced to magnetite and the magnetite is oxidized to acicular $\gamma$-iron(III) oxide, the improvement comprising: carrying out the oxidation of the iron(II) hydroxide suspension in three stages, wherein in a first stage from 0.1 to 4% by weight of the iron(II) present in the suspension is oxidized over a period of from 0.1 to 4 hours; in a second stage from 10 to 25% by weight of the iron(II) hydroxide originally present in the suspension is oxidized over an additional period of 1.5 to 6 hours by introducing at the beginning of said second stage from 0.04 to 0.1 mole per hour of oxygen/gram atom of the iron contained in the suspension and gradually increasing the introduction of oxygen during said second stage up to 0.1 to 0.25 mole per hour of $O_2$/g atom of iron at the end thereof; and in a third stage oxidizing the remaining iron(II) by introducing 0.3 to 0.8 moles of oxygen per hour per gram atom of iron contained in the suspension.

2. A process as claimed in claim 1, wherein, in the first stage, the suspension is oxidized by stirring in contact with the atmosphere.

3. A process as claimed in claim 1, wherein, in the first stage, rom 0.5 to 1.2% by weight of the amount of iron(II) contained in the suspension are oxidized in the course of from 2 to 3 hours.

4. A process as claimed in claim 1, wherein the oxidation in the second stage is carried out in the course of from 2 to 5 hours.

5. A process as claimed in claim 1, wherein, at the beginning of the second stage, from 0.05 to 0.08 mole of oxygen per gram atom of the iron contained in the suspension is introduced per hour into the suspension and this amount of oxygen is gradually increased to from 0.12 to 0.20 mole up to the end of the second stage.

6. A process as claimed in claim 1, wherein air is used as the oxygen-containing gas.

7. A process as claimed in claim 1, wherein the goethite is dehydrated to $\alpha$-iron(III) oxide prior to the reduction to magnetite.

* * * * *